(12) United States Patent
Chen et al.

(10) Patent No.: US 10,213,873 B2
(45) Date of Patent: Feb. 26, 2019

(54) SCRAP REMOVAL DEVICE FOR A LASER PROCESSING DEVICE

(71) Applicant: INDUSTRIAL TECHNOLOGY RESEARCH INSTITUTE, Hsinchu (TW)

(72) Inventors: Chun-Ming Chen, Tainan (TW); Chun-Jen Gu, Taipei (TW); Chun-Ping Jen, Tainan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 197 days.

(21) Appl. No.: 14/973,963

(22) Filed: Dec. 18, 2015

(65) Prior Publication Data
US 2017/0120382 A1 May 4, 2017

(30) Foreign Application Priority Data
Nov. 3, 2015 (TW) .............................. 104136200 A

(51) Int. Cl.
*B23K 26/00* (2014.01)
*B23K 26/16* (2006.01)
(Continued)

(52) U.S. Cl.
CPC .......... *B23K 26/16* (2013.01); *B23K 26/0006* (2013.01); *B23K 26/142* (2015.10); *B23K 26/388* (2013.01); *B23K 2103/54* (2018.08)

(58) Field of Classification Search
None
See application file for complete search history.

(56) References Cited

U.S. PATENT DOCUMENTS 4,757,180 A * 7/1988 Kainz .................. B23K 9/1336
219/136
4,871,897 A 10/1989 Nielsen
(Continued)

FOREIGN PATENT DOCUMENTS

CN  1142794 A  2/1997
CN  1570190 A  1/2005
(Continued)

OTHER PUBLICATIONS

SIPO, Office Action dated Jan. 3, 2018.
(Continued)

*Primary Examiner* — Ibrahime A Abraham
*Assistant Examiner* — Gyounghyun Bae
(74) *Attorney, Agent, or Firm* — Rabin & Berdo, P.C.

(57) ABSTRACT

A scrap removal device for a laser processing device includes a gas deflector having an optical channel; a looped gas channel; and a looped gas outlet. The looped gas outlet is connected to the looped gas channel, the optical channel is configured for a laser beam to transmit through, the looped gas channel surrounds the optical channel, and a section of the looped gas channel close to the looped gas outlet is inclined. The scrap removal device further includes a gas source furnished on the gas deflector and in communication with the looped gas channel for providing a gas flow to flow into the looped gas channel. The gas flow is joined with the laser beam transmitting along a looped processing path when flowing out of the gas deflector through the looped gas channel and the looped gas outlet.

14 Claims, 11 Drawing Sheets

(51) Int. Cl.
 *B23K 26/388* (2014.01)
 *B23K 26/142* (2014.01)
 *B23K 103/00* (2006.01)

(56) References Cited

U.S. PATENT DOCUMENTS

| | | | | |
|---|---|---|---|---|
| 5,321,228 | A * | 6/1994 | Krause | B05B 7/228 219/121.64 |
| 5,444,212 | A | 8/1995 | MacNaughton et al. | |
| 5,780,807 | A | 7/1998 | Saunders | |
| 5,876,767 | A | 3/1999 | Mattes et al. | |
| 6,326,585 | B1 * | 12/2001 | Aleshin | B23K 26/032 219/121.63 |
| 6,563,080 | B2 | 5/2003 | Shapovalov et al. | |
| 6,696,667 | B1 | 2/2004 | Flanagan | |
| 6,787,732 | B1 * | 9/2004 | Xuan | B23K 26/0057 219/121.67 |
| 6,927,359 | B2 | 8/2005 | Kleine et al. | |
| 7,692,115 | B2 | 4/2010 | Sasaki et al. | |
| 7,873,093 | B2 * | 1/2011 | van der Maas | B23K 26/123 372/58 |
| 9,765,726 | B2 * | 9/2017 | Aharonov | F02F 1/004 |
| 2007/0278195 | A1 * | 12/2007 | Richerzhagen | B23K 26/0665 219/121.69 |
| 2009/0068598 | A1 * | 3/2009 | Murase | B23K 26/0732 430/311 |
| 2009/0212032 | A1 * | 8/2009 | Geisel | B23K 15/002 219/121.72 |
| 2009/0230095 | A1 * | 9/2009 | Liebold | B23K 9/296 219/121.5 |
| 2010/0078408 | A1 * | 4/2010 | Liebold | H05H 1/28 219/121.5 |
| 2010/0252541 | A1 * | 10/2010 | Hogan | B23K 26/127 219/121.67 |
| 2012/0055907 | A1 * | 3/2012 | Allimant | H05H 1/34 219/121.51 |
| 2012/0211923 | A1 * | 8/2012 | Garner | C03B 33/04 264/400 |
| 2013/0233837 | A1 | 9/2013 | Chen | |
| 2014/0224773 | A1 * | 8/2014 | Murata | B23K 3/0607 219/74 |
| 2014/0284312 | A1 * | 9/2014 | Chen | H05H 1/34 219/121.5 |
| 2015/0004895 | A1 * | 1/2015 | Hammers | B23K 9/16 454/49 |
| 2015/0122783 | A1 * | 5/2015 | Luick | B23K 26/082 219/121.64 |
| 2015/0165553 | A1 * | 6/2015 | Gaebelein | B23K 26/38 219/121.84 |
| 2017/0050198 | A1 * | 2/2017 | Ohno | B23K 26/144 |

FOREIGN PATENT DOCUMENTS

| | | |
|---|---|---|
| CN | 101148760 A | 3/2008 |
| CN | 103286445 A | 9/2013 |
| CN | 103826792 A | 5/2014 |
| CN | 104942435 A | 9/2015 |
| JP | H07100673 A | 4/1995 |
| JP | H09122950 A | 5/1997 |
| TW | 577364 U | 2/2004 |
| TW | I271252 B | 1/2007 |
| TW | 201018538 A | 5/2010 |
| TW | 201400225 A | 1/2014 |
| TW | M503279 U | 6/2015 |
| TW | M510208 U | 10/2015 |

OTHER PUBLICATIONS

Tseng et al., A Visual Observation of the Air Flow Pattern for the High Speed Nozzle Applicable to High Power Laser Cutting and Welding, International Communications in Heat and Mass Transfer 49 (2013), pp. 49-54.

Schneider et al.,Gas Investigation for Laser Drilling, Hal, Feb. 28, 2013, pp. 1-6.

Khan et al., Influence of Microsupersonic Gas Jets on Nanosecond Laser Percussion Drilling, Optics and Lasera in Engineering 45 (2007), pp. 709-718.

Taiwan Patent Office, Office Action, Patent Application Serial No. TW104136200, dated Jul. 27, 2016, Taiwan.

* cited by examiner

US 10,213,873 B2

SCRAP REMOVAL DEVICE FOR A LASER PROCESSING DEVICE

CROSS-REFERENCE TO RELATED APPLICATIONS

This non-provisional application claims priority under 35 U.S.C. § 119(a) on Patent Application No(s). 104136200 filed in Taiwan, R.O.C. on Nov. 3, 2015, the entire contents of which are hereby incorporated by reference.

TECHNICAL FIELD

The disclosure relates to a laser processing device and a scrap removal device for the laser processing device.

BACKGROUND

With the development of touch panel, the demand of thin and rigid cover glass for the touch panel has been increasing. The traditional computer numerical control (CNC) tool is inapplicable for machining the thin and rigid cover glass. The laser processing is capable of machining without contacting the workpiece so that it is applicable for machining the thin and rigid cover glass. Thus, the CNC processing is gradually replaced with the laser processing in the manufacture of the touch panel.

SUMMARY

According to the disclosure, a laser processing device includes a laser emitter, an optical processor, a gas deflector and a gas source. The laser emitter is for emitting a laser beam. The optical processor is furnished on the optical path of the laser beam for guiding the laser beam to transmit along a looped processing path. The gas deflector has an optical channel, a looped gas channel and a looped gas outlet. The looped gas outlet is connected to the looped gas channel, the optical channel is used for the laser beam to transmit through, the looped gas channel surrounds the optical channel, and a section of the looped gas channel close to the looped gas outlet is furnished in inclined position. The gas source is furnished at the gas deflector and communicated with the looped gas channel for providing a gas flow to flow into the looped gas channel, and the gas flow is guided by the looped gas channel.

According to the disclosure, a scrap removal device for a laser processing device includes a gas deflector and a gas source. The gas deflector has an optical channel, a looped gas channel and a looped gas outlet. The looped gas outlet is connected to the looped gas channel. The optical channel is for a laser beam to transmit through. The looped gas channel surrounds the optical channel, and a section of the looped gas channel close to the looped gas outlet is inclined. The gas source is furnished on the gas deflector and communicated with the looped gas channel for providing a gas flow to flow into the looped gas channel. The gas flow is joined with the laser beam transmitting along a looped processing path when flowing out of the gas deflector through the looped gas channel and the looped gas outlet.

BRIEF DESCRIPTION OF THE DRAWINGS

The present invention will become more understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
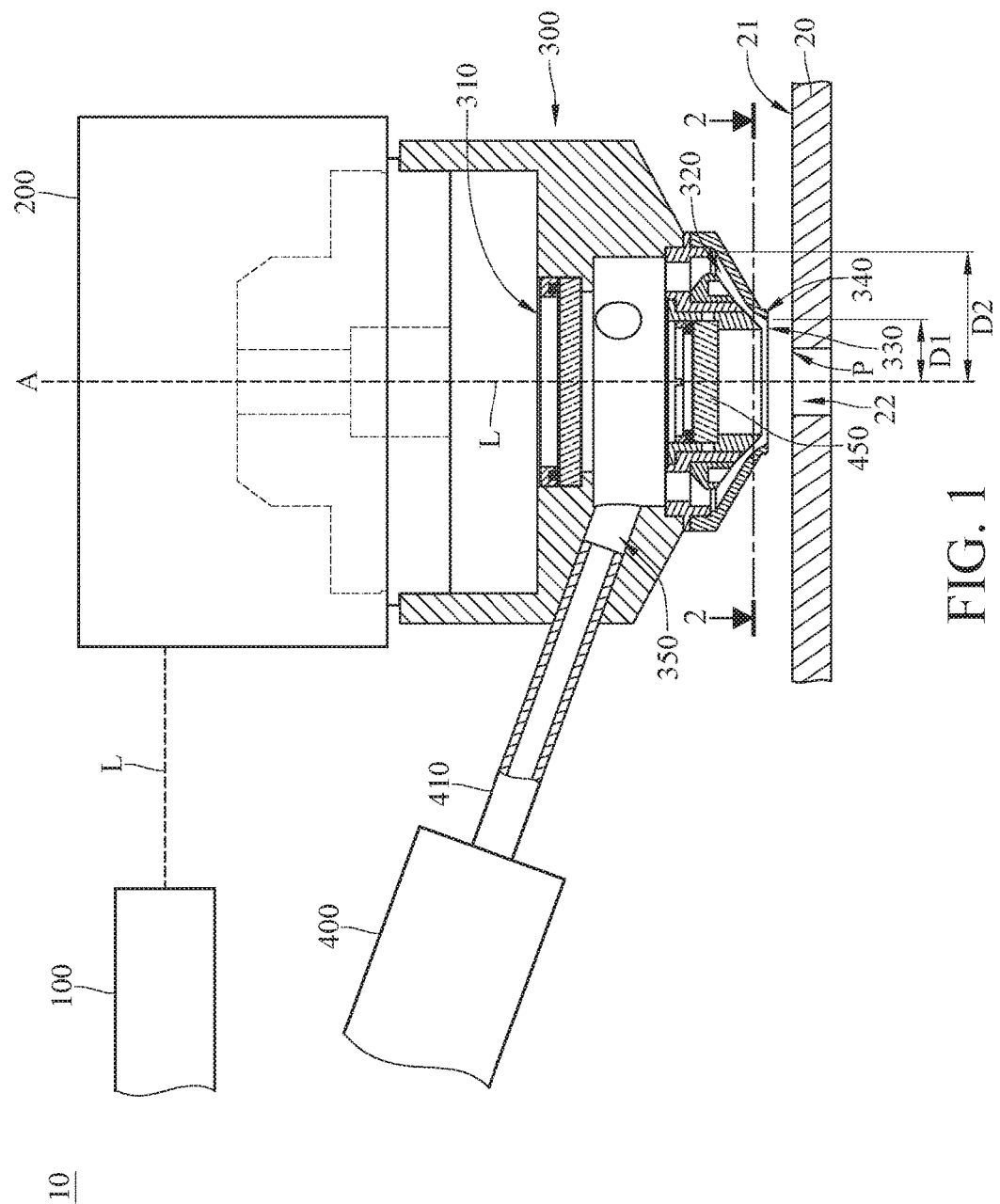
FIG. 1 is a cross sectional view of a laser processing device according to a first embodiment.
Figure 2:
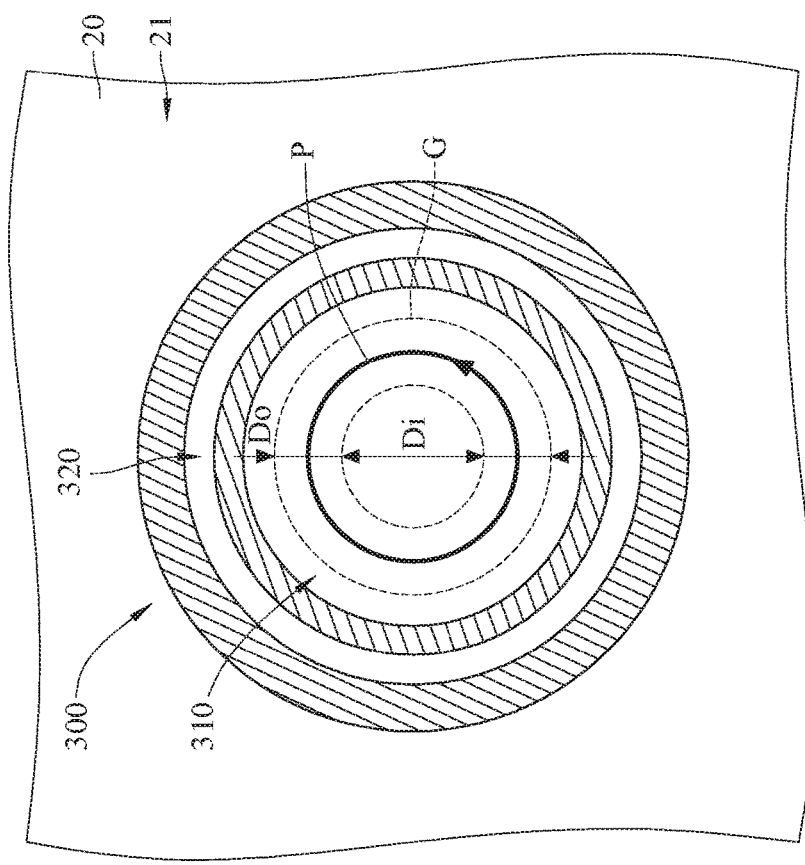
FIG. 2 is a cross sectional view of the laser processing device along line 2-2 in FIG. 1.

Please refer to FIG. 1 and FIG. 2. FIG. 1 is a cross sectional view of a laser processing device according to a first embodiment. FIG. 2 is a cross sectional view of the laser processing device along line 2-2 in FIG. 1. The laser processing device is for processing a workpiece such as drilling, heating and cutting the workpiece. In this embodiment, the laser processing device 10 is for cutting a workpiece 20 to form a hole 22 on a surface 21 of the workpiece 20. The laser processing device 10 includes a laser emitter 100, an optical processor 200 and a scrap removal device. The scrap removal device includes a gas deflector 300, a gas source 400 and a light transmitting member 450.

The laser emitter 100 is for emitting a laser beam L. The laser beam L, for example, can be ultraviolet laser light, semiconductor green laser light, near-infrared laser light or far-infrared laser light.

The optical processor 200, for example, can be an optical rotary trepanning module or a galvanometric scanning module, and the optical processor 200 is furnished on an optical path of the laser beam L. The optical processor 200 is for guiding the laser beam L to transmit along a looped processing path P (as shown in FIG. 2). The looped processing path P is located on the surface 21 of the workpiece 20, and the laser beam L cuts the workpiece 20 along the looped processing path P to form the hole 22. In this embodiment, the looped processing path P is annular, and a diameter of the looped processing path P is larger than or equal to 1.0 millimeter.

The gas deflector 300 has an optical channel 310, a looped gas channel 320, a looped gas outlet 330 and at least one gas inlet 350, and the looped gas outlet 330 is communicated with the looped gas channel 320. The optical channel 310 has a central axis A. The laser beam L is able to transmit through the optical channel 310 and circle along the looped processing path P in the optical channel 310. The optical channel 310 is surrounded by the looped gas channel 320, and a section 340 of the looped gas channel 320 close to the looped gas outlet 330 is furnished in inclined position. In detail, as shown in FIG. 1, a distance D1 between an end of looped gas channel 320 adjacent to the looped gas outlet 330 and the central axis A is smaller than a distance D2 between an end of looped gas channel 320 away from the looped gas outlet 330 and the central axis A.

The gas inlet 350 is located at a side of the gas deflector 300, and the gas inlet 350 is connected to the optical channel 310 and the looped gas channel 320. In this embodiment, the number of the gas inlet 350 is one, but the disclosure is not limited thereto. In other embodiments, the gas deflector 300 can have plural gas inlets 350 which are located at different sides of the gas deflector 300, respectively.

Figure 3A:
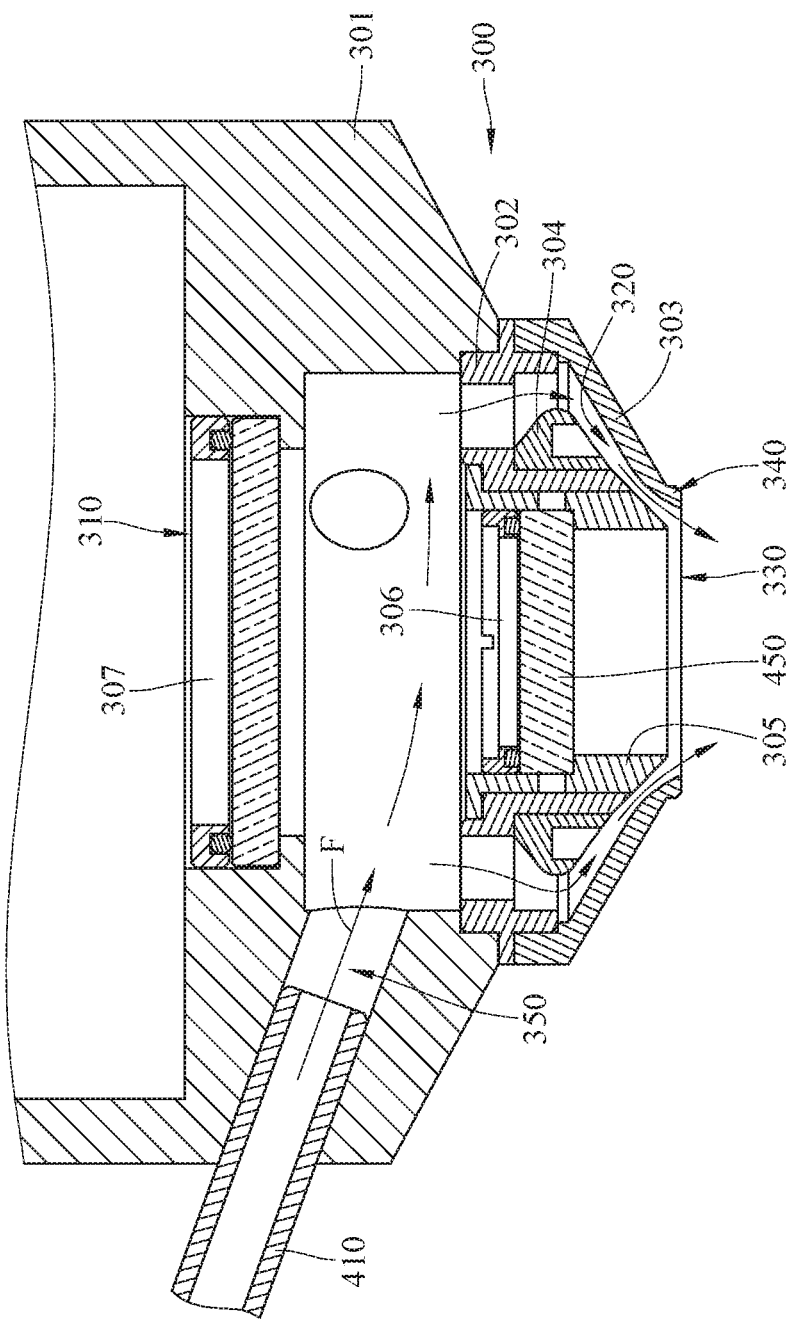
FIG. 3A is an enlarged view of the scrap removal device in FIG. 1.
Figure 3B:
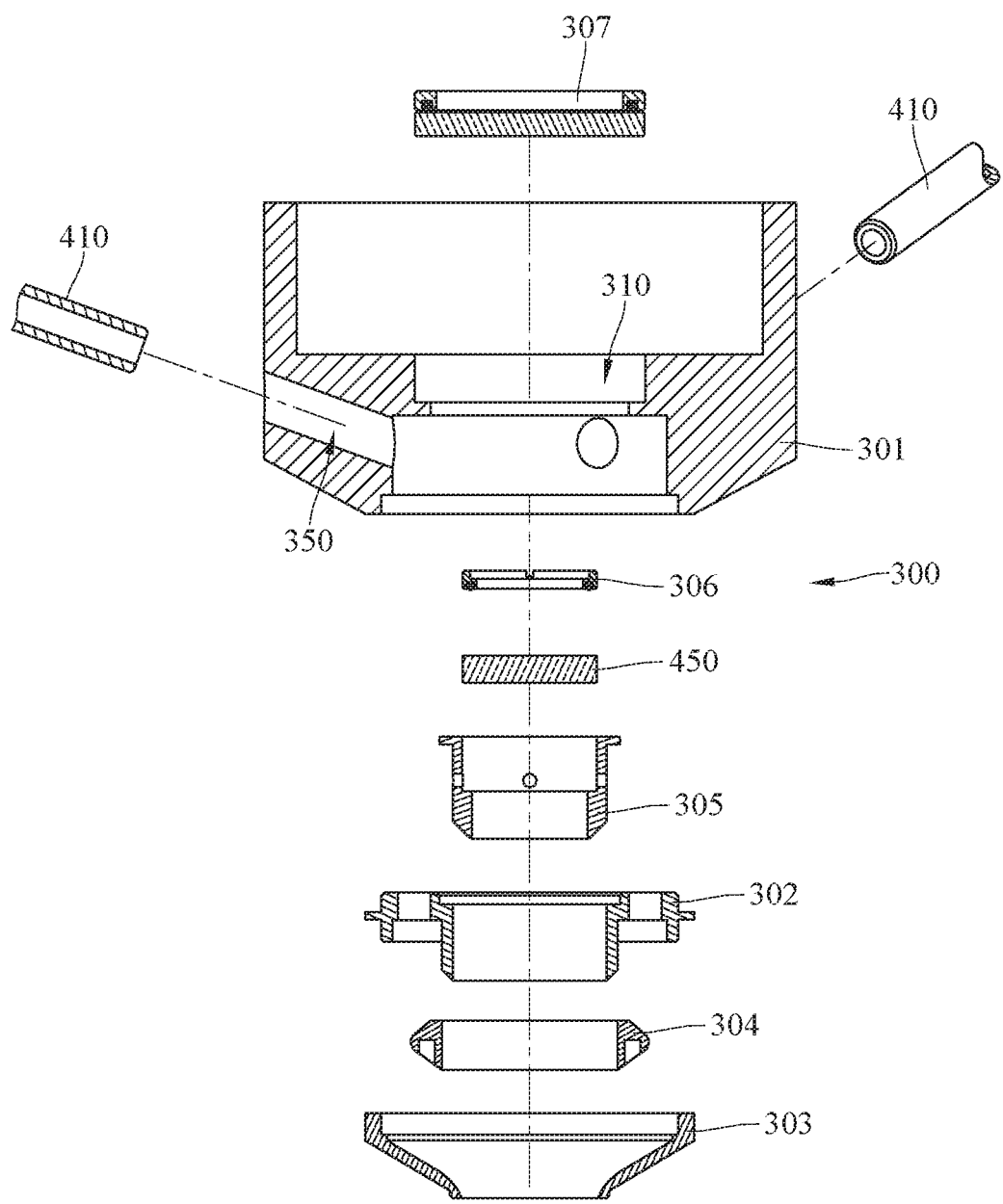
FIG. 3B is an exploded view of the scrap removal device in FIG. 3A.

In this embodiment, the gas deflector 300 can be provided by assembling plural members. Please refer to FIG. 2 to FIG. 3B. FIG. 3A is an enlarged view of the scrap removal device in FIG. 1. FIG. 3B is an exploded view of the scrap removal device in FIG. 3A. The gas deflector 300 of the scrap removal device can include a main body 301, an inner shell 302, an outer shell 303, a deflecting member 304, an assembling member 305, a first sealing member 306 and a second sealing member 307. The shapes of the inner shell 302, the outer shell 303, the deflecting member 304, the assembling member 305, the first sealing member 306 and the second sealing member 307 are all annular, and the optical channel 310 extends through opposite two sides of the main body 301, the inner shell 302, the outer shell 303, the deflecting member 304, the assembling member 305, the first sealing member 306 and the second sealing member 307. The inner shell 302 and the outer shell 303 are furnished on the bottom of the main body 301, and the inner shell 302 is surrounded by the outer shell 303. The deflecting member 304 is furnished on an end of the inner shell 302 close to the outer shell 303, thereby streamlining the looped gas channel 320. The assembling member 305 penetrates through the inner shell 302 and protrudes from the bottom of the inner shell 302. The assembling member 305 is surrounded by the outer shell 303. Therefore, the inner shell 302, the outer shell 303, the deflecting member 304 and the assembling member 305 together form the looped gas channel 320. The first sealing member 306 is furnished on the main body 301 by the assembling member 305 for fixing the light transmitting member 450 in the inner shell 302. The second sealing member 307 is furnished on the main body 301 and located above the first sealing member 306. The first sealing member 306 and the second sealing member 307 are favorable for preventing the optical channel 310 from being communicated with the looped gas channel 320 so as to prevent the leakage of a gas flow F from the optical channel 310, and thereby the gas flow F totally flows into the looped gas channel 320 and totally flows out of the looped gas outlet 330 through the looped gas channel 320.

When the gas flow F flows from the gas inlet 350 into the main body 301, the gas flow F firstly flows into a space between the first sealing member 306 and the second sealing member 307. The first sealing member 306 blocks the flowing path for the gas flow F in the optical channel 310 so that the gas flow F totally flows to the sides of the main body 301. Next, the gas flow F flows into the looped gas channel 320 formed by the inner shell 302, the outer shell 303, the deflecting member 304 and the assembling member 305 and finally flows out of the gas deflector 300 through the looped gas channel 320 and the looped gas outlet 330.

In this embodiment, the main body 301, the inner shell 302, the outer shell 303, the deflecting member 304 and the assembling member 305 are plural single members which are assembled together as a part of the gas deflector 300, but the disclosure is not limited thereto. In other embodiments, the main body 301, the inner shell 302, the outer shell 303, the deflecting member 304 and assembling member 305 are integrally formed as a single member.

The gas source 400 is furnished on the gas deflector 300 with a tube 410 connected to the gas inlet 350. The light transmitting member 450 is furnished in the optical channel 310 so that the gas source 400 is communicated with the looped gas channel 320 while the gas source 400 is not connected to the optical channel 310. That is, the light transmitting member 450 is favorable for blocking the optical channel 310 so that the gas flow F generated by the gas source 400 flows to the surface 21 through the looped gas channel 320 and the looped gas outlet 330 instead of flowing through the optical channel 310.

As shown in FIG. 2, the gas flow F is guided by the looped gas channel 320. The blowing region G is annular, and the blowing region G has an outer side and an inner side that are opposite to each other. Both a diameter Di of the outer side and a diameter Do of the inner side of the blowing region G are not equal to zero. The gas pressure at the blowing region G is larger than the gas pressure at the outside of the blowing region G. That is, the gas pressure between the outer side and the inner side is larger than the gas pressure at both the region surrounded by the inner side and the region out of the outer side. For example, when the pressure of the gas generated by the gas source 400 is 10.0 bar ($1 \times 10^5$ N/m$^2$), the gas pressure at the blowing region G (between the outer side and the inner side) is about 5.0~6.0 bar, and the gas pressure at the outside of the blowing region G (at the region surrounded by the inner side and the region out of the outer side) is about 0~5.0 bar.

Moreover, as shown in FIG. 2, the blowing region G is joined with the laser beam L which transmits along the looped processing path P. In this embodiment, the looped processing path P is located in the blowing region G. Generally, when the laser processing device cuts the workpiece, the part of the workpiece drilled by the laser beam leaves scraps on the surface of the workpiece. Since the light transmitting member 450 prevents the gas flow F from flowing to the region on the surface 21 surrounded by the inner side of the blowing region G, the gas flow F totally flows to the region in the looped processing path P where most of the scraps is left, and thereby it is favorable for improving the efficiency of removing the scraps so as to enhance the efficiency of the laser processing device 10 for drilling the workpiece 20. According to an experimental result, a process time of drilling a hole having a 10 millimeters diameter in the workpiece by a traditional laser processing device is about 38.0 seconds. Moreover, a large amount of scraps is left on the surface of the workpiece when the traditional laser processing device is drilling the workpiece. In this embodiment, a process time of drilling a hole having a 10 millimeters diameter in the workpiece 20 by the laser processing device 10 is about 25.0 seconds. Moreover, there is no scrap left on the surface 21 when the laser processing device 10 is drilling the workpiece 20 since the scraps is removed by the gas flow F. Therefore, the gas flow F flows through the looped gas channel 320 to the blowing region G so as to remove the scraps on the surface 21 of the workpiece 20, and thereby it is favorable for improving the efficiency of the laser processing device 10 for drilling the workpiece 20 and the quality of the drilling process.

Figure 4:
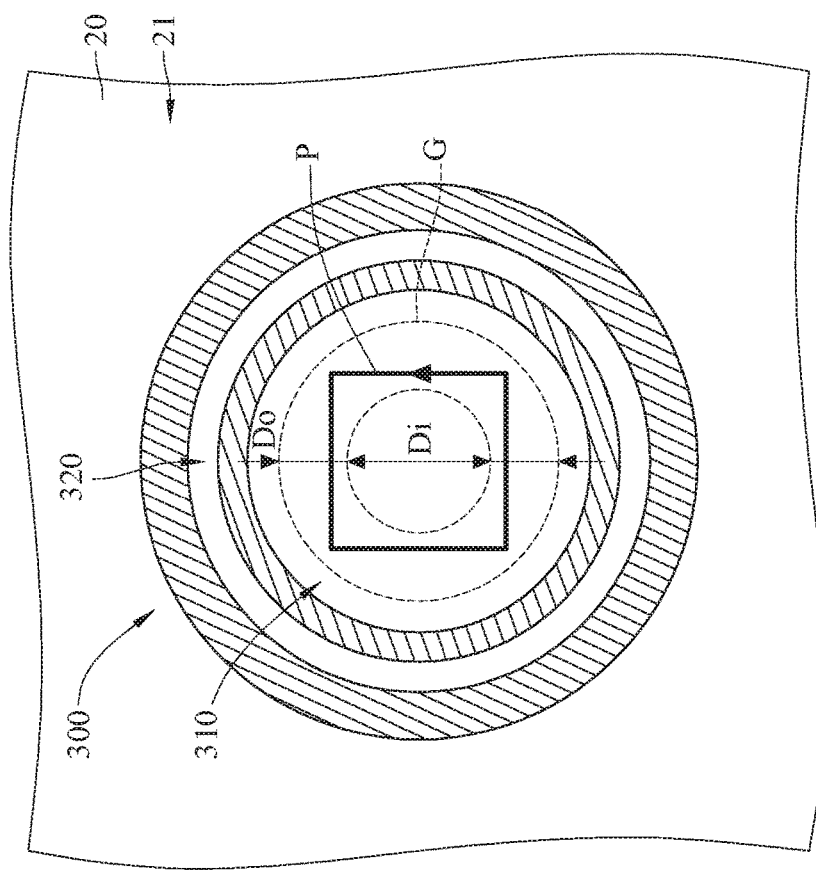
FIG. 4 is a cross sectional view of the laser processing device in FIG. 2 with the looped processing path changed from circle into rectangle.

In this embodiment, the looped processing path P is annular for drilling a circular hole in the workpiece 20, but the disclosure is not limited thereto. In other embodiments, the looped processing path P can be rectangular, triangular or star-shaped. Please refer to FIG. 4. FIG. 4 is a cross sectional view of the laser processing device in FIG. 2 with the looped processing path changed from circle into rectangle. In this embodiment, the looped processing path P can be changed from circle into rectangle by a control unit (not shown in the drawings) for drilling a rectangular hole in the workpiece 20. Furthermore, the rectangular processing path P is still located in the blowing region G. Therefore, the gas flow F is still able to remove the scraps so as to improve the efficiency of the laser processing device 10 for drilling the workpiece 20 and the quality of the drilling process.

Figure 5:
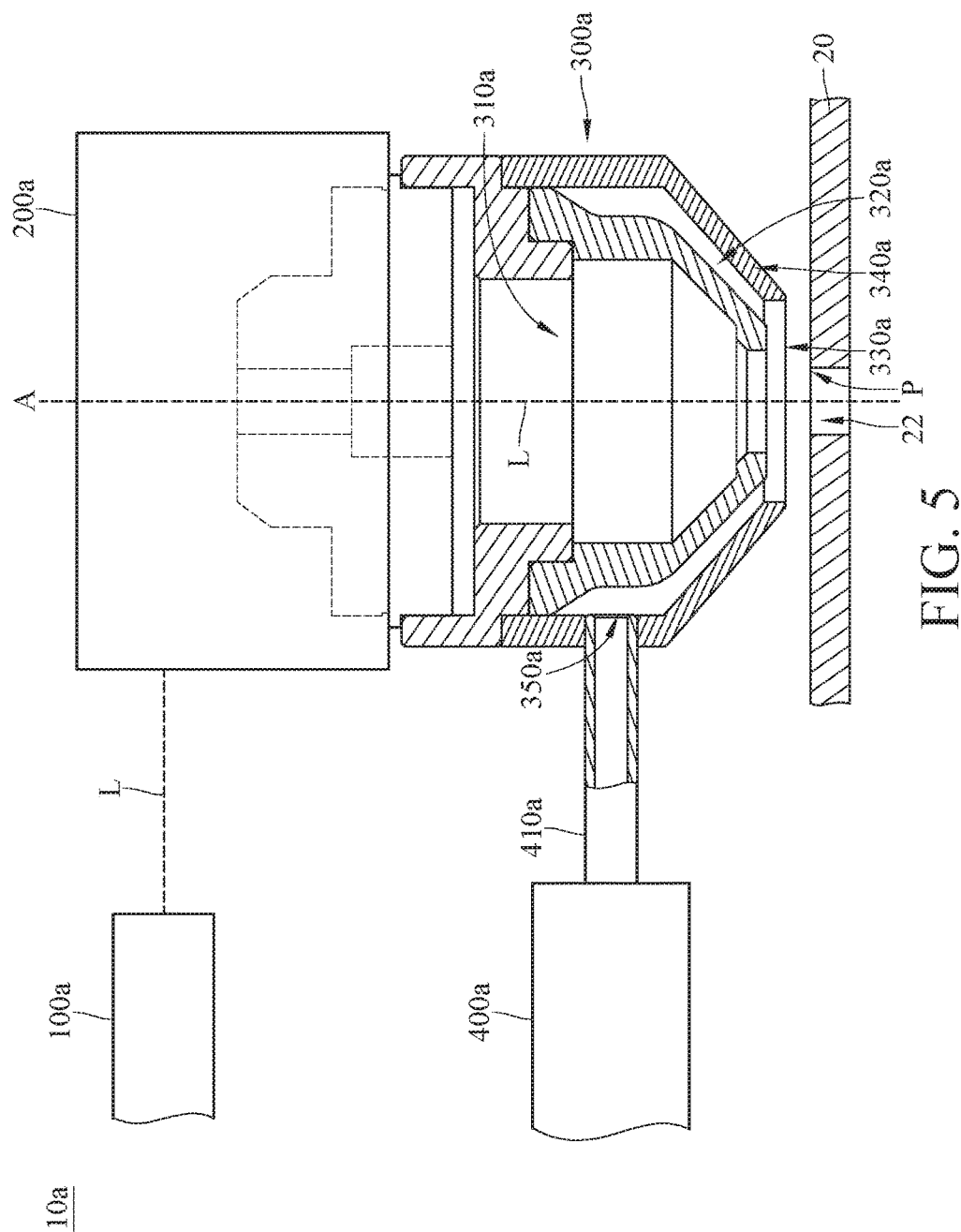
FIG. 5 is a cross sectional view of a laser processing device according to a second embodiment.
Figure 6:
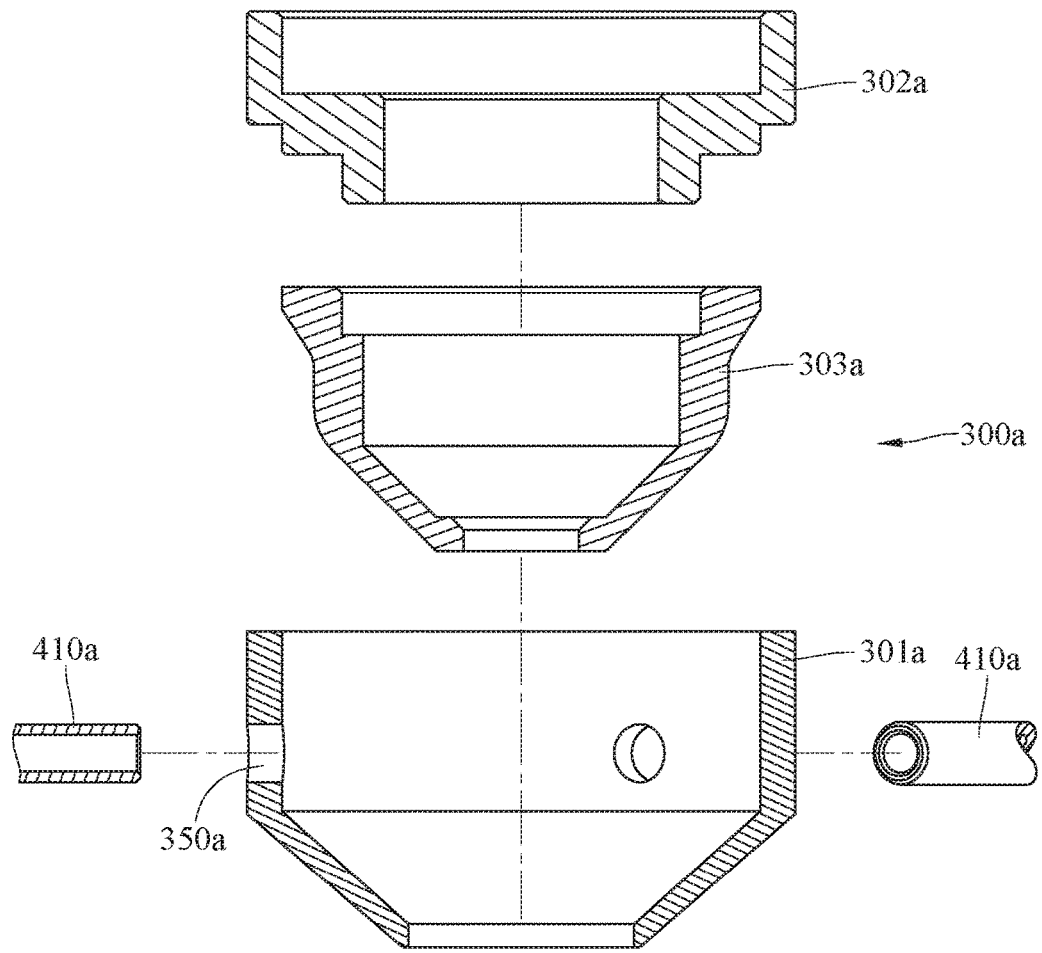
FIG. 6 is an exploded view of the scrap removal device in FIG. 5.

In the first embodiment, the gas inlet 350 of the gas deflector 300 is connected to the optical channel 310 so that the light transmitting member 450 is needed for preventing the leakage of the gas flow F from the optical channel 310, but the disclosure is not limited thereto. Please refer to FIG. 5 and FIG. 6. FIG. 5 is a cross sectional view of a laser processing device according to a second embodiment. FIG. 6 is an exploded view of the scrap removal device in FIG. 5. Since the second embodiment is similar to the first embodiment, only the differences will be illustrated hereafter.

In this embodiment, the laser processing device 10a includes a laser emitter 100a, an optical processor 200a, a gas deflector 300a and a gas source 400a. Disclosure for the laser emitter 100a, the optical processor 200a and the gas source 400a can be referred to the illustration of the laser emitter 100, the optical processor 200 and the gas source 400 in the first embodiment, respectively, and this illustration is not repeated hereafter.

The gas deflector 300a has an optical channel 310a, a looped gas channel 320a, a looped gas outlet 330a and at least one gas inlet 350a, and the looped gas outlet 330a is communicated with the looped gas channel 320a. The gas inlet 350a is located at a side of the gas deflector 300a, and the gas inlet 350a is communicated with the looped gas channel 320a while not connected to the optical channel 310a. Therefore, it is unnecessary to dispose any light transmitting member or shutter in the optical channel 310a.

In this embodiment, the gas deflector 300a can include an outer shell 301a, an assembling member 302a and an inner shell 303a. The outer shell 301a and the inner shell 303a are assembled to each other by the assembling member 302a, and the looped gas channel 320a is formed between the outer shell 301a and the inner shell 303a. The optical channel 310a extends through opposite two sides of the outer shell 301a, the assembling member 302a and the inner shell 303a. The optical channel 310a is not communicated with the looped gas channel 320a.

In this embodiment, the outer shell 301a, the assembling member 302a and the inner shell 303a which are plural single members assembled together as a part of the gas deflector 300a, but the disclosure is not limited thereto. In other embodiments, the outer shell 301a, the assembling member 302a and the inner shell 303a are integrally formed as a single member.

Figure 7:
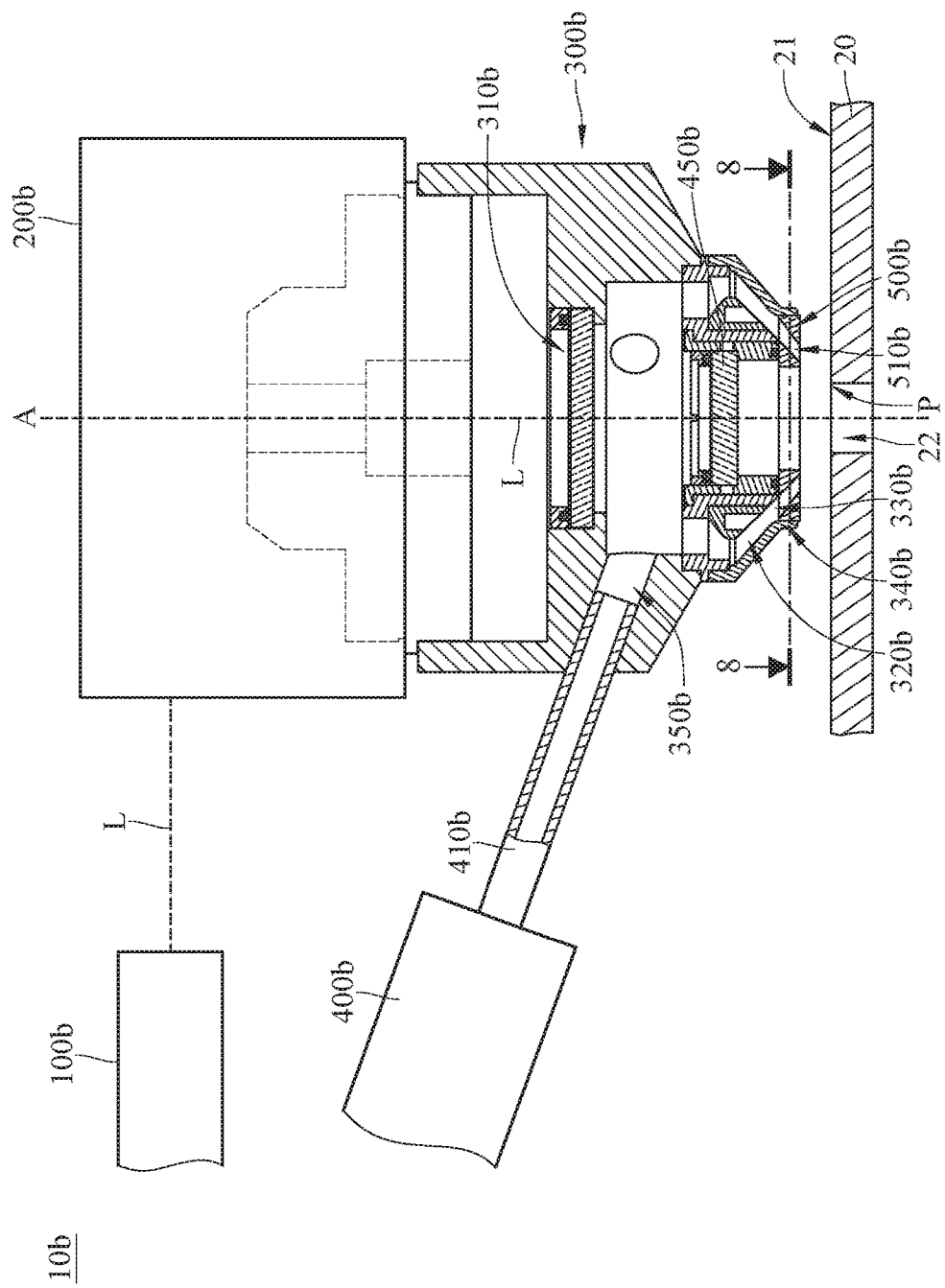
FIG. 7 is a cross sectional view of a laser processing device according to a third embodiment.
Figure 8:
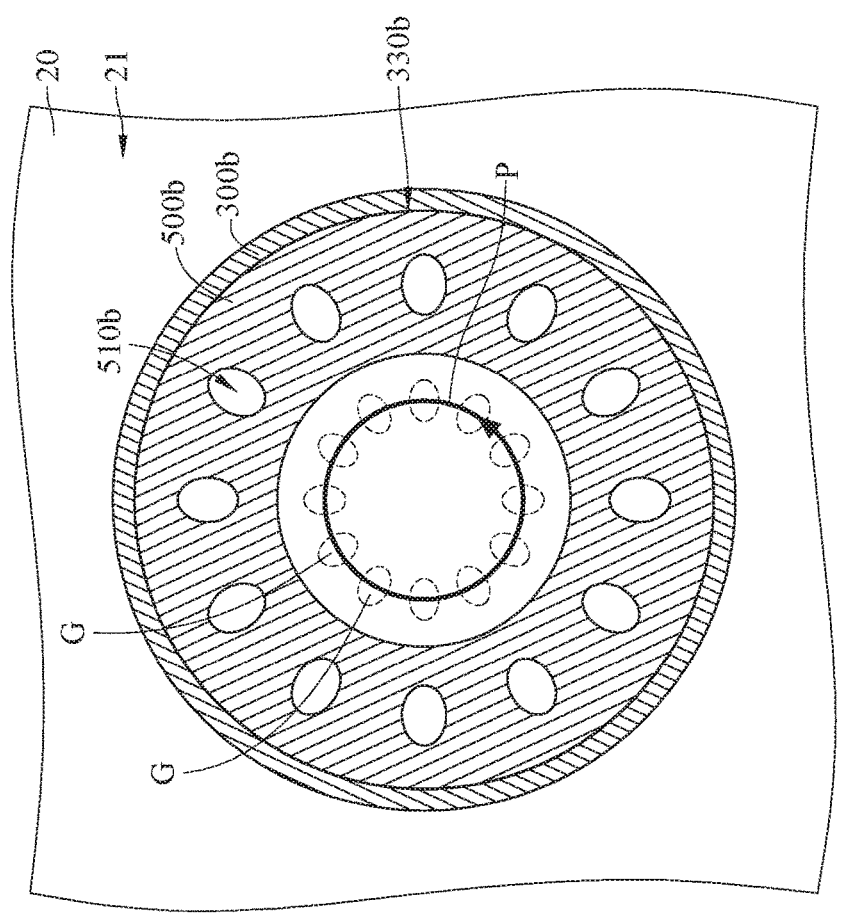
FIG. 8 is a cross sectional view of the laser processing device along line 8-8 in FIG. 7.

Please refer to FIG. 7 and FIG. 8. FIG. 7 is a cross sectional view of a laser processing device according to a third embodiment. FIG. 8 is a cross sectional view of the laser processing device along line 8-8 in FIG. 7. Since the third embodiment is similar to the first embodiment, only the differences will be illustrated hereafter.

In this embodiment, the laser processing device 10b includes a laser emitter 100b, an optical processor 200b, a gas deflector 300b, a gas source 400b, a light transmitting member 450b and a gas flow blocking member 500b. Disclosure for the laser emitter 100b, the optical processor 200b, the gas source 400b and the light transmitting member 450b can be referred to the illustration of the laser emitter 100, the optical processor 200, the gas source 400 and the light transmitting member 450 in the first embodiment, respectively, and this illustration is not repeated hereafter.

The laser processing device 10b further includes a gas flow blocking member 500b. The gas flow blocking member 500b is furnished on the looped gas outlet 330b of the gas deflector 300b, and the gas flow blocking member 500b has a plurality of gas channels 510b arranged around a center of the looped gas outlet 330b. In this embodiment, the center of the looped gas outlet 330b is overlapped with the central axis A of the optical channel 310b.

In this embodiment, the gas flow flows on the surface 21 through the gas channels 510b so as to form plural blowing regions G on the surface 21. The gas flow blocking member 500b covers most part of the looped gas outlet 330b, and a total area of the blowing regions G in this embodiment is smaller than an area of the blowing region G in the first embodiment. Therefore, the gas flow is strongly ejected from the gas channels 510b so as to increase the gas pressure at the blowing regions G. For example, when the pressure of the gas generated by the gas source 400b is 10.0 bar, the gas pressure at each of the blowing regions G is about 7.50 bar. Furthermore, a process time of drilling a hole having a 10 millimeters diameter in the workpiece 20 by the laser processing device 10b is about 22.0 seconds.

Figure 9:
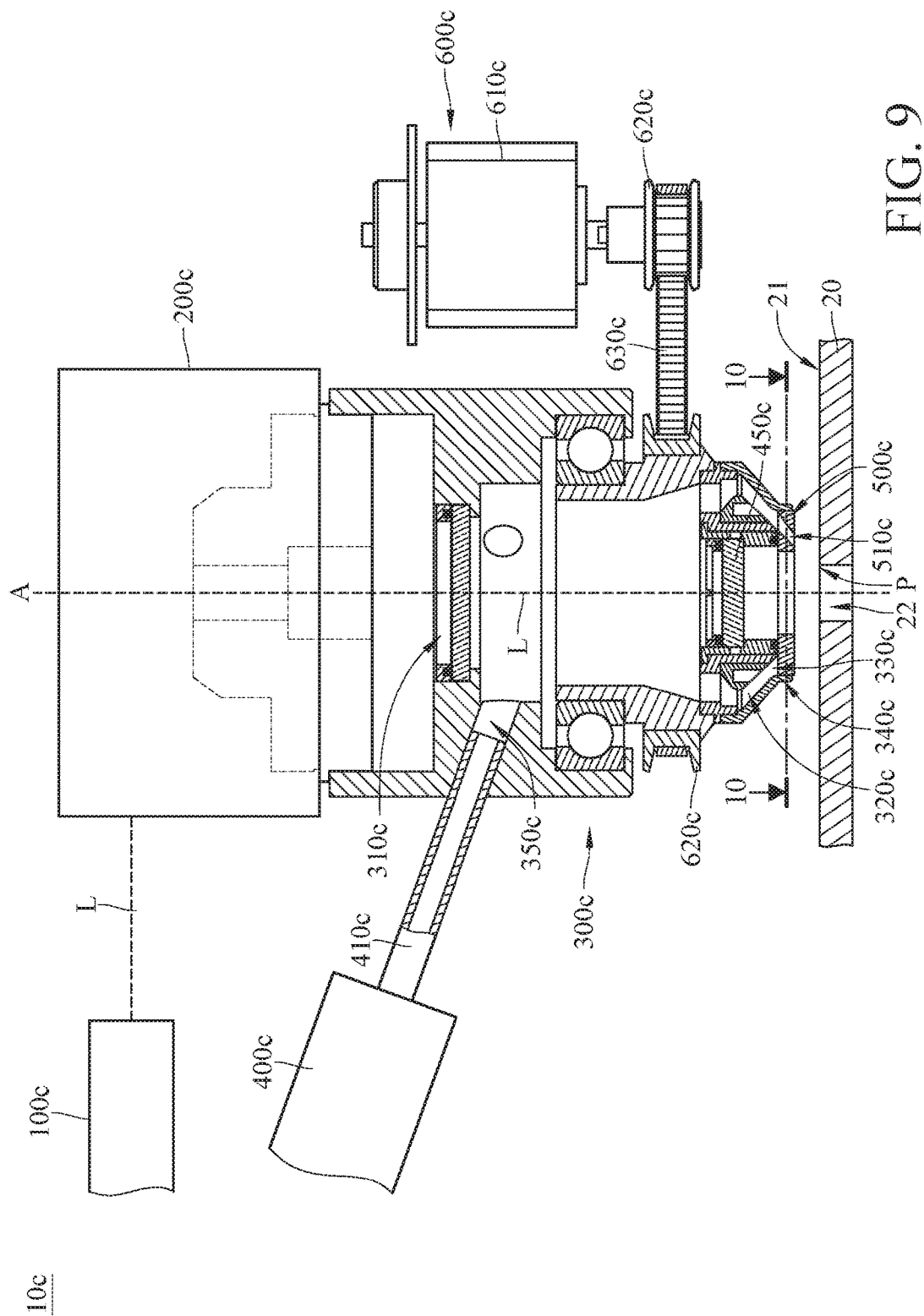
FIG. 9 is a cross sectional view of a laser processing device according to a fourth embodiment.
Figure 10:
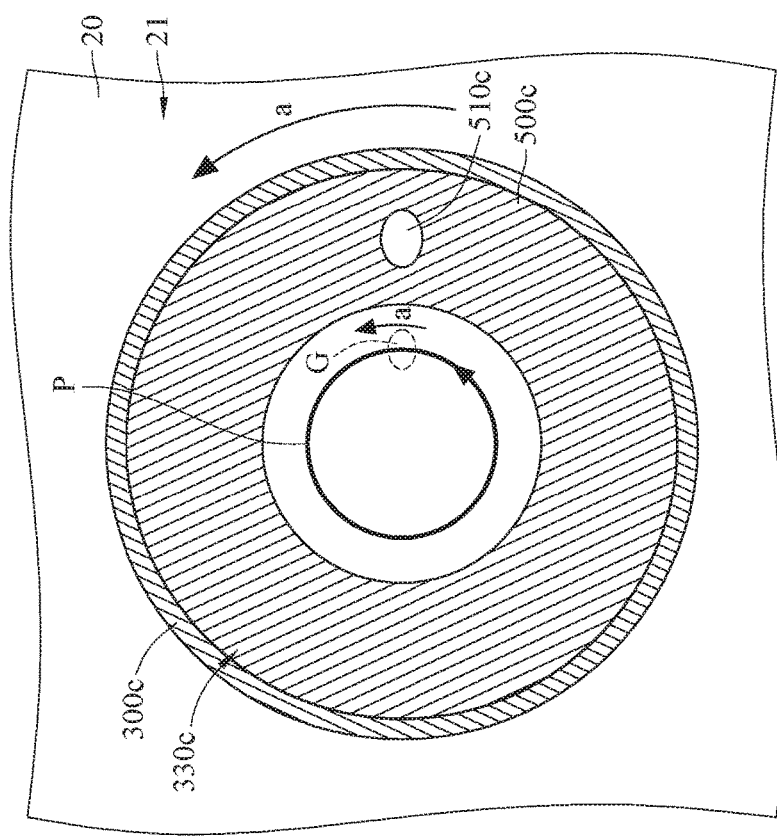
FIG. 10 is a cross sectional view of the laser processing device along line 10-10 in FIG. 9.

Please refer to FIG. 9 and FIG. 10. FIG. 9 is a cross sectional view of a laser processing device according to a fourth embodiment. FIG. 10 is a cross sectional view of the laser processing device along line 10-10 in FIG. 9. Since the fourth embodiment is similar to the first embodiment, only the differences will be illustrated hereafter.

In this embodiment, the laser processing device 10c includes a laser emitter 100c, an optical processor 200c, a gas deflector 300c, a gas source 400c, a light transmitting member 450c, a gas flow blocking member 500c and a rotating driver 600c. Disclosure for the laser emitter 100c, the optical processor 200c, the gas source 400c and the light transmitting member 450c can be referred to the illustration of the laser emitter 100, the optical processor 200, the gas source 400 and the light transmitting member 450 in the first embodiment, respectively, and this illustration is not repeated hereafter.

The laser processing device 10c further includes a gas flow blocking member 500c. The gas flow blocking member 500c has a single gas channel 510c, and the gas flow blocking member 500c is furnished on the looped gas outlet 330c of the gas deflector 300c.

The rotating driver 600c is connected to the gas flow blocking member 500c for driving the gas flow blocking member 500c to rotate around a central axis A of the optical channel 310c. In detail, the rotating driver 600c can include a motor 610c, two driving wheels 620 and a belt 630. The driving wheels 620c are respectively furnished on the motor 610c and the gas deflector 300c. The belt 630c surrounds the two driving wheels 620c for rotating the gas flow blocking member 500c via the gas deflector 300c.

In this embodiment, the gas flow flows on the surface 21 through the gas channel 510c so as to form the blowing region G on the surface 21. Since the rotating driver 600c rotates the gas flow blocking member 500c so as to move the gas channel 510c along the looped processing path P, the blowing region G is dynamic. The gas flow blocking member 500b covers most part of the looped gas outlet 330b, and an area of the blowing region G in this embodiment is smaller than the area of the blowing region G in the first embodiment. Therefore, the gas flow is strongly ejected from the gas channel 510c so as to increase the gas pressure at the blowing region G. For example, when the pressure of the gas generated by the gas source 400c is 10.0 bar, the gas pressure at the blowing region G is about 9.0 bar. Furthermore, a process time of drilling a hole having a 10 millimeters diameter in the workpiece 20 by the laser processing device 10c is about 20.6 seconds.

According to the disclosure, the gas flow generated by the gas source flows out of the gas deflector through the looped gas outlet and the looped gas channel so as to form the blowing region corresponding to the looped processing path. Therefore, it is favorable for removing the scraps on the surface of the workpiece so as to improve the efficiency of the laser processing device for drilling the workpiece and the quality of the drilling process.

Furthermore, the laser processing device can include the gas flow blocking member for covering a part of the looped gas outlet so as to form plural blowing regions arranged along the looped processing path. The laser processing device can further include the rotating driver for rotating the gas flow blocking member so as to move the gas channel along the looped processing path, thereby forming the dynamic blowing region. Therefore, the arrangement of the gas flow blocking member and the rotating driver is favorable for increasing the pressure of the gas flowing to the blowing region on the surface of the workpiece so as to further improve the efficiency of the laser processing device for drilling the workpiece and the quality of the drilling process.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. A scrap removal device for a laser processing device, comprising:
  (a) a gas deflector that has an optical channel defined axially therethrough that permits transmission of a laser beam and that comprises:
    a main body that is disposed with an axial through cavity that includes the optical channel;
    at least one gas inlet disposed within the main body in communication with the axial through cavity for supplying gas to the main body;
    an inner shell that is assembled to the main body and sealed with respect to the main body by a first sealing member, that has defined therethrough a central channel in communication with the axial through cavity and disposed with a light transmitting member, that has defined therethrough an annular gas channel that is disposed proximate to a perimeter portion of the inner shell and that communicates with the axial through cavity of the main body;
    a deflecting member assembled to the inner shell in communication with the annular gas channel;
    an outer shell that is disposed with a central channel in communication with the axial through cavity, that has a funnel shape, that surrounds the inner shell and the deflecting member and that together with the inner shell and the deflecting member define a looped gas channel that is an annular gas channel that surrounds the optical channel but is separate from the optical channel; and
    a looped gas outlet that is an annular gas outlet, that terminates the looped gas channel, and that has a section that is disposed near the looped gas outlet that is inclined; and
  (b) a gas source that furnishes a flow of gas to the axial through cavity of the main body of the gas deflector via the at least one gas inlet between a space between the first sealing member and a second sealing member which is axially disposed in an upper portion of the main body to direct the flow of gas to sides of the main body and into the looped gas channel, which flow of gas exits the looped gas channel via the looped gas outlet and is joined with the laser beam transmission along a looped processing path when flowing out of the gas deflector through the looped gas channel and the looped gas outlet to provide a blowing region for scrap removal during laser processing.

2. The scrap removal device according to claim 1, wherein the light transmitting member blocks the optical channel and prevents the flow of gas into the optical channel.

3. The scrap removal device according to claim 1, wherein a surface of a workpiece is processed by the flow of gas and the laser beam in which the flow of gas flows onto the surface of the workpiece for forming a blowing region, wherein the looped processing path is located on the surface of the workpiece, and wherein the looped processing path is located within the blowing region.

4. The scrap removal device according to claim 3, wherein the blowing region has an outer side and an inner side that are opposite to each other, and the inner side has a diameter that is not equal to zero.

5. A scrap removal device for a laser processing device, comprising:
  (a) a gas deflector having:
    (i) an optical channel for a laser beam to transmit therethrough;
    (ii) looped gas channel surrounding the optical channel; and
    (iii) a looped gas outlet connected to the looped gas channel, wherein a section of the looped gas channel that is close to the looped gas outlet is inclined:
  (b) a gas source furnished on the gas deflector in communication with the looped gas channel for providing a gas flow to flow into the looped gas channel, the gas flow being joined with the laser beam transmitting along a looped processing path when flowing out of the gas deflector through the looped gas channel and the looped gas outlet; and
  (c) a gas flow blocking member provided on the looped gas outlet of the gas deflector and having a plurality of gas channels arranged around a center of the looped gas outlet.

6. The scrap removal device according to claim 5, further comprising a light transmitting member for the laser beam to transmit through, wherein the light transmitting member blocks the optical channel and prevents gas flow into the optical channel.

7. The scrap removal device according to claim 5, wherein a surface of a workpiece is processed by the gas flow and the laser beam in which the gas flow flows onto the surface of the workpiece for forming a blowing region, wherein the looped processing path is located on the surface of the workpiece, and wherein the looped processing path is located in the blowing region.

8. The scrap removal device according to claim 7, wherein the blowing region has an outer side and an inner side that are opposite to each other, and the inner side has a diameter that is not equal to zero.

9. A scrap removal device for a laser processing device, comprising:
   (a) a gas deflector having:
      (i) an optical channel for a laser beam to transmit therethrough;
      (ii) looped gas channel surrounding the optical channel; and
      (iii) a looped gas outlet connected to the looped gas channel, wherein a section of the looped gas channel that is close to the looped gas outlet is inclined;
   (b) a gas source furnished on the gas deflector in communication with the looped gas channel for providing a gas flow to flow into the looped gas channel, the gas flow being joined with the laser beam transmitting along a looped processing path when flowing out of the gas deflector through the looped gas channel and the looped gas outlet; and
   (c) a gas flow blocking member having a gas channel and being provided on the looped gas outlet of the gas deflector.

10. The scrap removal device according to claim 9, further comprising a rotating driver connected to the gas flow blocking member for driving the gas flow blocking member to rotate around a central axis of the optical channel.

11. The scrap removal device according to claim 10, wherein the rotating driver comprises a motor, two driving wheels and a belt, the two driving wheels are respectively furnished on the motor and the gas deflector, the belt surrounds the two driving wheels for rotating the gas flow blocking member through the gas deflector.

12. The scrap removal device according to claim 9, further comprising a light transmitting member for the laser beam to transmit through, wherein the light transmitting member blocks the optical channel and prevents the flow of gas into the optical channel.

13. The scrap removal device according to claim 9, wherein a surface of a workpiece is processed by the gas flow and the laser beam in which the gas flow flows on the surface of the workpiece for forming a blowing region, wherein the looped processing path is located on the surface of the workpiece, and wherein the looped processing path is located in the blowing region.

14. The scrap removal device according to claim 13, wherein the blowing region has an outer side and an inner side that are opposite to each other, and the inner side has a diameter that is not equal to zero.

* * * * *